W. J. CANTELO.
Coal Stove.
No. 24,539.
Patented June 28, 1859.
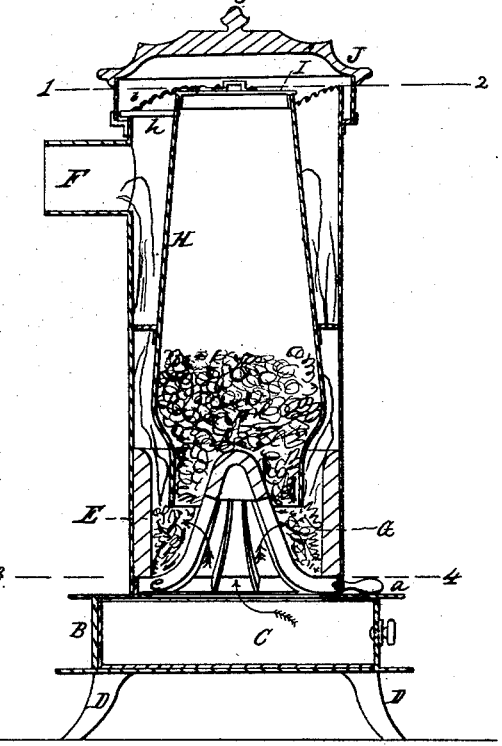
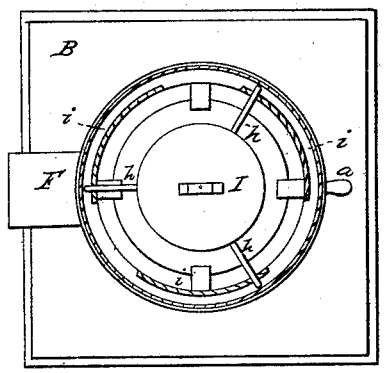
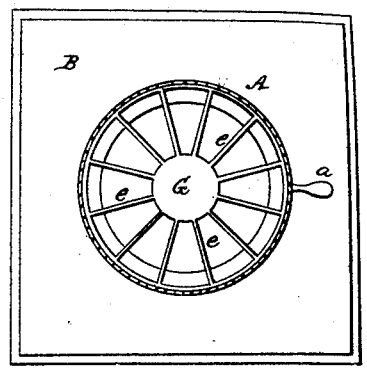
Witnesses:
Henry Howson
Horace See
Inventor:
W. J. Cantelo

UNITED STATES PATENT OFFICE.

WILLIAM J. CANTELO, OF BURLINGTON, NEW JERSEY.

IMPROVEMENT IN STOVES.

Specification forming part of Letters Patent No. 24,539, dated June 28, 1859.

*To all whom it may concern:*

Be it known that I, WILLIAM J. CANTELO, of Burlington, Burlington county, State of New Jersey, have invented a new and useful Improvement in Coal-Stoves; and I do hereby declare the following to be a full, clear, and exact description of the same, reference being had to the accompanying drawings, and to the letters of reference marked thereon.

My invention relates to an improvement in self-feeding coal-stoves in which an inner casing forming a reservoir for the coal is used; and my improvement consists in a certain combination and arrangement of an exterior casing, an inner casing, adjustable vertically, a fire-pot, and cone-shaped grate, described hereinafter, so that by raising or lowering the said inner casing the amount of ignited fuel may be increased or diminished at pleasure.

In order to enable others to make and use my invention, I will now proceed to describe its construction and operation.

On reference to the accompanying drawings, which form a part of this specification, Figure 1 is a sectional elevation of my improved coal-stove; Fig. 2, a sectional plan on the line 1 2, Fig. 1; Fig. 3, a sectional plan on the line 3 4, Fig. 1.

Similar letters refer to similar parts throughout the several views.

A is the exterior shell or casing of the stove, secured to the base B, which is furnished with the usual ash-drawer C, the whole being supported by ordinary legs D D.

E is the fire-pot, made of baked fire-clay or other suitable material, and F the pipe through which the products of combustion pass off to the chimney.

G is the grate, constructed in the peculiar manner illustrated in Fig. 1. The bars, instead of being horizontal as usual, project upward in the middle and assume the cone-shaped form shown, the cone terminating in a slightly-rounding apex, which extends as high or nearly as high as the top of the fire-pot. The apex is of solid iron, the bars of the grate commencing a short distance from the top and terminating with a curve at the bottom, where they join the ring e, which is cast to and forms a part of the grate. This ring fits snugly, but so as to turn freely, in the bottom of the casing and on the top of the ash-box B, and is furnished with a handle a, which projects through the exterior casing, and by means of which the whole grate may be agitated at pleasure.

H is a casing placed in the interior of and concentric with the exterior casing A. Near the top of this casing and from the side of the same project three or more rods h, which rest in notches in inclined projections i, attached to the top of the exterior casing. These inclined projections have a number of notches, in any of which the rods h may rest, so that when it is desired that the whole inner casing should be raised it is simply elevated and turned partially around, so that the rods h may fit into the more elevated notches. The top of the interior casing is furnished with a tightly-fitting but readily-detachable cover I, and the top of the exterior casing with a cover J, which may also be easily removed.

In preparing the empty stove for use a supply of wood, charcoal, or other readily-kindled material is deposited in the bottom of the annular space formed between the cone-shaped grating and the fire-pot, the covers I and J are removed, and the inner casing H filled with the ordinary stove-coal or even with coal broken so fine that it cannot be used in any of the ordinary stoves. The two covers are then replaced and a light applied to the under side of the grate, when the kindling material, and subsequently the coal, will rapidly ignite, the latter continuing to burn as long as a supply remains in the inner casing. Now as the top of the inner casing is closed, none of the air admitted through the bars of the grate can penetrate through the coal contained in the casing. Consequently this coal must remain unignited and unaffected by the heat, excepting by such heat as it receives from the heated casing by which it is surrounded, and this heat can have no other effect than that of warming the coal or slightly "coking" it, and thereby reducing it to a better condition for ignition when it drops to the ignited coals on the grate. The air, passing through the bars of the grate, will take the direction pointed out by the arrows—that is, directly through the fuel in the annular space between the cone-shaped grate and the fire-pot toward the point where the annular space between the fire-pot and inner casing commences. It will now be seen that no ignition of the coals in the inner casing can take place before they drop down and come within the range of the draft pointed out by the arrows. The flame and other products of combustion as they rise are confined to the annular space between the outer and inner casing, and consequently lick the inside of the outer casing and impart to it a greater heat than if the inner casing were absent.

When a larger body of ignited fuel is required to increase the heat, the inner casing may be raised in the manner above described, when a greater body of coal from this inner casing will fall within the range of the draft, and when a less fire is required, the casing is simply lowered, and it may be lowered to such a point as to extinguish the fire altogether.

A periodical agitation of the grate will be necessary, as in other stoves, and as the waste ashes drop between the bars and the ignited fuel falls an amount of coal falls from the inner casing sufficient to make up the deficiency, the new supply being readily ignited by coming within the range of the draft.

The bars of the cone-shaped grate may be so constructed as to be readily detached when a thorough cleansing of the fire-place becomes necessary.

I wish it to be understood that I do not claim an inner casing forming a reservoir for the coal, or a grate projecting upward in the middle, as both these devices are shown in the patent of D. G. Littlefield, January 24, 1854; but

I claim as my invention and desire to secure by Letters Patent—

The exterior casing A and inner adjustable casing H, in combination with the fire-pot F and cone-shaped grate G, when the several parts are arranged substantially as and for the purpose herein set forth.

In testimony whereof I have signed my name to this specification in the presence of two subscribing witnesses.

W. J. CANTELO.

Witnesses:
 HENRY HOWSON,
 CHARLES HOWSON.